Figure 1:
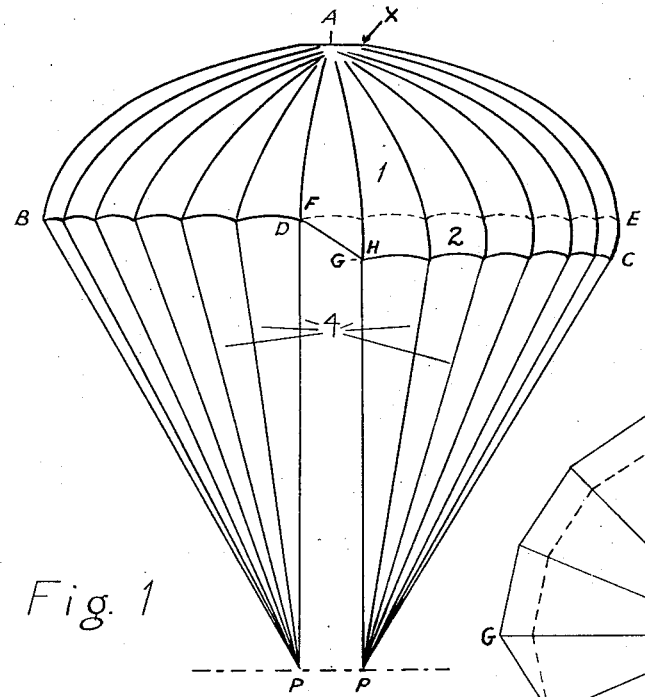

Dec. 29, 1942.   R. H. HART   2,307,000
PARACHUTE APPARATUS
Filed May 26, 1941

*Richard H. Hart*
INVENTOR.

Patented Dec. 29, 1942

2,307,000

UNITED STATES PATENT OFFICE 2,307,000

PARACHUTE APPARATUS

Richard H. Hart, New Orleans, La., assignor to Eagle Parachute Corporation, Lancaster, Pa.

Application May 26, 1941, Serial No. 395,154

5 Claims. (Cl. 244—145)

My invention relates to improvements in parachutes and parachute controlling devices, and consists in the combinations, constructions, and arrangements hereinafter described and claimed.

It may be well to note here that the invention about to be described is not the offspring of mere theorizing. It is the result of years of research and experimentation, and the parachute which embodies it has been tested with a full load under actual service conditions by experts of the United States Army Parachute Corps.

The parachute in most general use today has a canopy in the form of a regular polygon, but to parachute designers it is known as the "circular" parachute. For the sake of convenience, it will be so referred to hereinafter. It is well known that this "circular" parachute has certain advantages and disadvantages in comparison with other types less generally employed. Having its canopy in the form of a regular polygon and its suspension lines of equal length, it may be packed easily and quickly by any experienced rigger. It will also withstand a very great shock-load when constructed with proper regard for materials and workmanship. On the side of its disadvantages, the "circular" parachute is liable to violent oscillations, it is sometimes subject to "stream-lining," and it has but a minimum of maneuverability.

In view of these well-known facts, it has for a long time been the unrealized dream of parachute designers to evolve a parachute which would retain all the advantages of the "circular" parachute, and at the same time eliminate or greatly reduce its disadvantages. It is therefore evident that such a parachute is highly desirable.

In order to retain the advantages of the "circular" parachute in a parachute of improved design, it is necessary to observe the following prerequisites: 1. The suspension lines should be of approximately equal length, in order to secure practically even distribution of shock-load and consequent resistance to destruction, as well as to facilitate packing of the parachute in its container; 2. The canopy should be so designed and so attached to the suspension lines that when inflated its greatest horizontal perimeter shall have the approximate outline of a regular polygon, in order to secure practically even distribution of shock-load, as well as to insure that the strain put upon the suspension lines shall be in the approximate direction of their greatest strength, i. e., lengthwise.

Having thus provided for the retention in the improved parachute of the advantages inherent in the "circular" parachute, attention may be given to the elimination or reduction of the disadvantages associated with said "circular" parachute: liability to oscillation, liability to "streamlining," and paucity of maneuverability.

Considering first the matter of oscillation, it should be noted primarily that the "circular" parachute when in operation is riding upon a spheroid of compressed air of varying density, the upper and more highly compressed portion of this spheroid being within the canopy and the lower and less dense portion being beneath it. When the parachute is descending vertically and normally, the spheroid is constantly augmented by newly encountered air and reduced by the approximately even escape of previously compressed air around the edges of the canopy, as well as through its pores and central vent. As may be observed from the foregoing, the "circular" parachute is always in what is known as a state of unstable equilibrium. When struck by a gust of air, it readily begins to oscillate, the load swinging to one side and the canopy tilting correspondingly. This tilting of the canopy allows escape of a great part of the aforementioned spheroid of compressed air in the direction of the lifted side, permitting the parachute and its load to fall with increased velocity. The load then swings back, in the manner of a pendulum, restoring the vertical position of the parachute, rebuilding the spheroid of compressed air supporting it, and reducing the rate of descent. However, there being nothing to check the pendulum-like swing, it continues to the opposite side, repeating the previously described phenomena, and thus tending to perpetuate itself. If there remains sufficient time, and no new gust of air strikes the parachute, its oscillations may gradually "dampen out." But, if time be lacking, or a new gust of air strikes the parachute, it will be oscillating at the moment of landing. This is hazardous to the user, both on account of the increased rate of descent and the fact that an oscillation may dash him violently against the earth.

In contrast to the above, one of the features of my invention is the extension downward of one side of the canopy, permitting escape of air from the canopy much more readily and in greater volume from the unextended side than from the other, thus inducing in the parachute a state of stable equilibrium, promptly dampening out the oscillation usually incident to launching of a parachute, and resisting any tendency to renewed oscillation which might otherwise be caused by gusty air.

The phenomenon known as "streamlining" is usually caused by an overload, and is observed when the spheroid of compressed air above described is so distorted that it can better be described as "ovoid." When this happens, the parachute is able to slip through the air encountered during descent without the usual amount of disturbance thereto, so that it fails to render the normal degree of support, and the rate of descent is dangerously increased.

The same feature of my invention which resists oscillation also eliminates "streamlining." Since considerably more compressed air is escaping from one side of the canopy than from the other, there can be no uniform flow around it of encountered air, which is the essence of "streamlining."

With regard to maneuverability, when the user of a "circular" parachute is drifting with the wind and perceives that the normal course of his descent will take him farther than he desires to go, he may shorten the amount of drift by spilling air from his canopy. Since this increases his rate of descent at the time, and may also increase oscillation, it is rather hazardous. Secondly, in order to land facing in the direction of drift, the skillful user of a "circular" parachute is able to revolve it to a limited extent by pulling upon his suspension lines in a certain torsional manner. These two maneuvers constitute the approximate limit to which the "circular" parachute may be managed by the user during the course of descent.

In my invention, on the other hand, the same maneuvers may be performed as with the "circular" parachute, but there is an added feature of performance which in many instances is of immense value to the user. As mentioned previously, one side of the canopy is so extended as to form a curtain upon that side and thus divert the greater portion of escaping air to the other side. Back-pressure from this escaping air, acting upon the extended side, imparts motion to the parachute and adds to the course of descent a horizontal component independent of wind-drift. Since this imparted horizontal motion is in the direction of the extended side, that side becomes the front of the parachute, and the user faces in that direction, i. e., the direction of motion. By rotating the parachute in the same manner as he would a "circular" parachute, the user is thus able measurably to direct his course and select a desirable landing-place.

Another feature of my invention is the provision of a radial split which divides the periphery of the canopy on its rear side and extends for a certain distance toward the center or apex thereof. This radial split performs two useful functions. One of these is to permit the escape of additional compressed air on the rear side during descent, thus adding to the efficiency of the performance features previously described, and the second is to act as a vent and thus diminish the shock-load incident to inflation. In this connection, it should particularly be noted that such a radial split vent has been tested by this petitioner without the above described extension to the canopy, and found in that circumstance to be of negligible value save for reducing inflation-shock. In other words, it is only in combination with the extension to the canopy that it makes any important contribution to maneuverability or reduction of oscillation.

The objects of my invention, therefore, are to provide a parachute which may be packed with the same facility as a parachute of the familiar regularly polygonal type, and, materials and workmanship considered, be equally or even more resistant to destruction, and at the same time shall have reduced oscillation, freedom from streamlining, and increased maneuverability.

Figure 3:
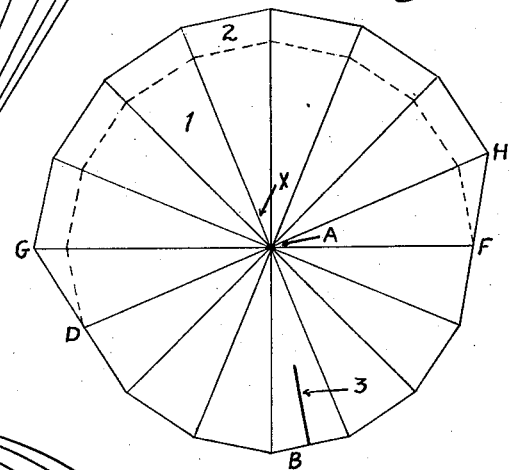
Figure 2:
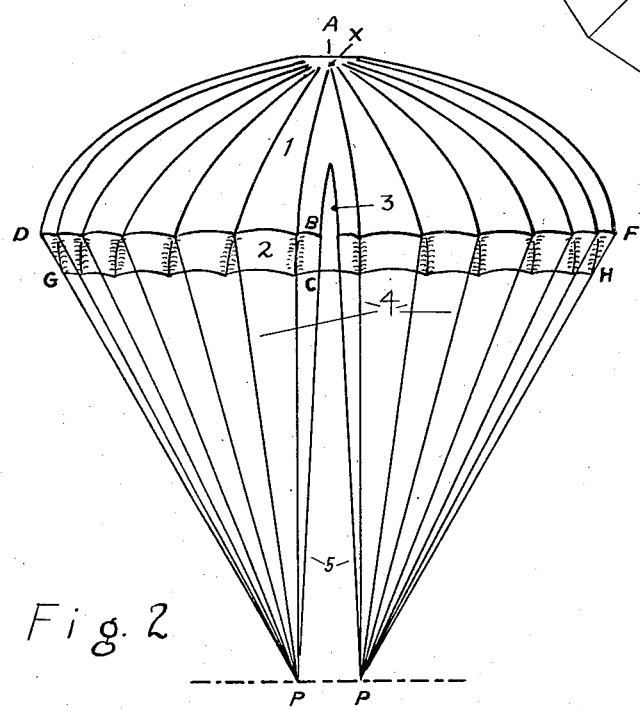

A form of my invention is illustrated in the accompanying drawing forming a part of this application, in which Figure 1 is an elevational view of the parachute canopy and suspension lines from the right-hand side;

Figure 2 is an elevational rear view of the parachute canopy and suspension lines, and Figure 3 is a plan view, on a reduced scale, of the parachute canopy.

In all of these figures, the part designated by the numeral 1 is that portion of the canopy which corresponds to the entire canopy of a regularly polygonal or "circular" parachute; the numeral 2 in all figures designates the extension to the canopy which is a feature of my invention; the numeral 3 in Figures 2 and 3 designates the radial split vent which is another feature of my invention; the numeral 4 in Figures 1 and 2 designates the suspension lines; the numeral 5 in Figure 2 designates the stay-lines attached to the outer corners of the material forming the sides of the radial split vent. Points are represented by letters, the same letters referring to identical points on each of the three figures.

Referring more particularly to the drawing, it will be seen that the portion of the canopy which is above the broken line in Figure 1, within the broken line in Figure 3, and above the interrupted line DF in Figure 2, and is designated by the numeral 1 in all figures, is identical in shape (except for the radial split vent therein) with the entire canopy of the well-known "circular" parachute. It will also be seen that the canopy is extended on one side by an additional area, designated by the numeral 2 and the letters DGHF in all figures. This extension, which is shown in Figure 3 as being in the same plane as the remainder of the canopy and having its angles bisected by the radii of such remainder of the canopy, is a principal feature of my invention. However, it is not necessary that this extension shall be formed as a plane. Its own radii may be made parallel to each other, or even to tend to approach each other at their outward and downward extremities, thus permitting the extension to conform more nearly to the suspension lines, 4, which traverse it and bisect its angles. This extension, 2, is shown in the drawing as circumscribing approximately one-half of the perimeter of the canopy, but it may be somewhat longer or shorter without greatly affecting its usefulness; however, experiments have proven that, should its length be less than one-third or more than two-thirds the length of the perimeter of the canopy, its usefulness for the purpose of reducing oscillation will be materially affected. The radial split vent, designated by the numeral 3, is seen to intersect the perimeter of the unextended side of the canopy and to extend from said perimeter a limited distance toward the apex, A. This distance is limited because of the fact that if it approached the apex too nearly there might be great difficulty in securing inflation of the parachute. However, there would exist no substantial reason why this vent should not extend very near to the apex if sealed temporarily with some breakable material, such as paper, which would permit inflation before giving way. In order that this radial split vent may automatically return to its normal size and shape after dissipation of the shock-load incident to inflation, there are attached to the outer corners of the material forming its sides stay-lines, 5, connected to the load by convenient means, and having approximately the same degree of tension as the suspension lines. It may be noted here that a suspension line could be arranged to function as a stay-line for this vent.

One method of representing a canopy which would satisfy the requirements of this invention, and which perhaps would be most easily understood, would be to describe it as composed of the diametrically joined halves of two similar regular polygons, the radii and diameter of one of which are greater than those of the other, the half-polygon having the shorter radii and diameter being provided with a radially split vent dividing its periphery, this vent having its outer corners stayed to the parachute's load.

It should be noted that the suspension lines, 4, meet at the apex, A, of the canopy, and are of approximately equal length; hence, in order to avoid possible confusion at some future time, it may be well to observe the following definition: The suspension lines of a parachute may be said to be equal in length if, regardless of whether the parachute be inflated or be deflated and extended along the line of its vertical axis (as for packing), said suspension lines are found to traverse equal distances from the apex of the canopy to the point where each is intersected by the same plane perpendicular to said vertical axis and interposed between the canopy and the load. In the accompanying drawing, such a plane is represented by dot-and-dash lines in Figures 1 and 2, and such points of intersection by the letters PP. It will thus be seen that, when this definition is adhered to, such technicalities as varying the lengths of the "risers" or the points of attachment to the load will not affect the fundamental equality of the suspension lines and the consequent shape or attitude of the parachute. In a case where a suspension line did not physically extend to the apex of the canopy, a part of the load-strain borne by it would nevertheless be passed on to that portion of the canopy lying in a direct line between the point of attachment of the suspension line to the canopy and the apex of the canopy, and such portion of the canopy lying along such direct line might properly be considered as being part and parcel of said suspension line.

It is well known to designers and users of parachutes that a parachute will inflate more readily if not tautened by a pilot-parachute, but since use of a pilot-parachute is frequently desirable to draw the parachute promptly and properly from its pack, such pilot-parachute is commonly employed. It is also recognized that, where a pilot-parachute is employed, readier inflation of the parachute could usually be secured by attachment of said pilot-parachute to one side of the apex of the parachute's canopy, thereby permitting the opposed side of said canopy to remain untautened. However, this practice has been avoided because of the possibility that, should it be employed with the ordinary "circular" parachute, the edge of said untautened side of the parachute might become folded up and around the tautened edge, thereby closing the parachute's lower aperture, and delaying or preventing inflation. However, it will readily be seen that a pilot-parachute may be attached to the improved parachute described in this specification, at a measurable distance from the apex thereof in the direction of the extended side of the canopy, said distance of point of attachment from the apex, of course, being less than the distance to which said side is extended, without permitting the untautened edge of the canopy to attain a position where it could enfold the tautened edge and thereby imperil inflation. Such a point is indicated on all figures of the accompanying drawing by the letter X, it being noted that in Figure 2 this point is upon the farther side of the canopy, as indicated by a broken arrow.

Coming now to the operation and use of the parachute embodying the invention hereinabove described, it will first be assumed that the parachute has been launched by any desired method. After complete inflation has occurred, the radial split vent will be seen to part widely, allowing air to escape therefrom and preventing excessive compression of air within the canopy and consequent destructive inflation-shock. After dissipation of the inflation-shock, the split vent is partially closed by means of its stay-lines, so that there is no untowardly great spillage of air therefrom and consequent harmful diminution of support. The initial oscillation, incident to launching of any parachute, will be promptly dampened out by the stability of the parachute induced by its peculiar design, and any new tendency to oscillation which might otherwise be caused by gusty air will be resisted for the same reason. The parachute is now seen to be descending in an approximately upright position, and since he is freed from preoccupation with the problem of oscillation the user can give his entire attention to that of directing his parachute to a desirable landing-point. At the beginning, the course of descent will probably have two horizontal factors: that caused by wind-drift and that caused by back-pressure of escaping air against the extended side of the canopy; however, these two factors will tend to become merged, since the extension to the canopy will function somewhat in the manner of a jib-sail, to keep the front of the parachute before the wind. It will thus be seen that the parachutist is traveling in a forward direction, which is the direction most favorable for landing. Should he perceive that the course of his descent would normally carry him farther than he desires, he can shorten such course by spilling air from the canopy, as previously mentioned, or he can, by twisting the canopy around as also mentioned, oppose the motion of the canopy generated by escaping air to the drift caused by the wind, thereby reducing such drift. Greater or less degrees of rotation of the canopy will enable him to avoid certain obstacles which he might otherwise encounter in landing.

It will thus be seen that, by freeing the user of a large portion of the hazards and uncertainties frequently incident to descent by parachute, the improved parachute hereinabove described will greatly increase its user's ability to make safe and convenient landings.

I claim:

1. A parachute having a canopy of flexible material and suspension lines of approximately equal length, an outward and downward extension of a part of said canopy, said extension being of convenient depth and its perimetric length being not less than one-third, nor more than two-thirds, of the entire perimeter of the canopy.

2. A parachute having a canopy of flexible material and suspension lines of approximately equal length, an outward and downward extension of a part of said canopy, said extension being of convenient depth and its perimetric length being not less than one-third, nor more than two-thirds of the entire perimeter of the canopy, and the unextended part of said canopy being provided with a radial split vent dividing the periphery of said unextended part of the canopy and traversing the canopy for a convenient distance toward the apex thereof.

3. A parachute having a canopy of flexible material and suspension lines of approximately equal length, said parachute being capable of sustaining a load connected by suitable means to the suspension lines, an outward and downward extension of a part of said canopy, said extension being of convenient depth and not less than one-third, nor more than two thirds, of the entire perimeter of the canopy, and the unextended part of said canopy being provided with a radial split vent dividing the periphery of said unextended part of the canopy and traversing the canopy for a convenient distance toward the apex thereof, the outer corners of the material forming the sides of said radial split vent being connected to the load carried by the parachute, by stay-lines having approximately the same tension as the suspension lines.

4. A parachute having a canopy of flexible material and suspension lines of approximately equal length, said canopy being provided with a radial split vent dividing its periphery and traversing the canopy for a convenient distance toward the apex thereof, the outer corners of the material forming the sides of said radial split vent being connected to the load carried by the parachute, by stay-lines having approximately the same tension as the suspension lines.

5. A parachute having a canopy of flexible material and suspension lines of approximately equal length, an outward and downward extension of a part of said canopy, said extension being of convenient depth, and the unextended part of said canopy being provided with a radial split vent dividing the periphery of said unextended part of the canopy and traversing the canopy for a convenient distance toward the apex thereof, the outer corners of the material forming the sides of said radial split vent being connected to the load carried by the parachute, by stay-lines having approximately the same tension as the suspension lines.

RICHARD H. HART.